US012155536B2

(12) United States Patent
Mishra et al.

(10) Patent No.: US 12,155,536 B2
(45) Date of Patent: *Nov. 26, 2024

(54) DISTRIBUTED, SELF-ADJUSTING AND OPTIMIZING CORE NETWORK WITH MACHINE LEARNING

(71) Applicant: A5G Networks, Inc., Nashua, NH (US)

(72) Inventors: Rajesh Kumar Mishra, Westford, MA (US); Kaitki Agarwal, Westford, MA (US)

(73) Assignee: A5G Networks, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,503

(22) Filed: May 31, 2023

(65) Prior Publication Data
US 2023/0308361 A1 Sep. 28, 2023

Related U.S. Application Data

(63) Continuation of application No. 17/542,646, filed on Dec. 6, 2021, now Pat. No. 11,706,101.
(Continued)

(51) Int. Cl.
*H04L 12/00* (2006.01)
*H04L 41/0246* (2022.01)
(Continued)

(52) U.S. Cl.
CPC .......... *H04L 41/16* (2013.01); *H04L 41/0246* (2013.01); *H04L 41/0823* (2013.01);
(Continued)

(58) Field of Classification Search
CPC . H04L 41/16; H04L 41/0246; H04L 41/0823; H04L 41/0886; H04L 41/14; H04L 41/5019; H04L 41/145
(Continued)

(56) References Cited

U.S. PATENT DOCUMENTS 10,666,674 B1  5/2020  Sadaghiani et al.
10,868,752 B2  12/2020 Nemirovsky et al.
(Continued)

FOREIGN PATENT DOCUMENTS

CN       102111822 B    4/2014
CN       111193971 A    5/2020
WO    WO-2018176768 A1  10/2018

OTHER PUBLICATIONS

"U.S. Appl. No. 17/542,646, Ex Parte Quayle Action mailed Oct. 3, 2022", 9 pgs.
(Continued)

*Primary Examiner* — Frantz Coby
(74) *Attorney, Agent, or Firm* — Schwegman Lundberg & Woessner, P.A.

(57) ABSTRACT

A system and method for dynamically creating distributed, self-adjusting and optimizing core network with machine learning is disclosed. The method includes receiving a request to access one or more services and establishing a secure real time communication session with one or more client devices and a set of service layers based on the received request. The method further includes determining one or more service parameters based on the received request and sending one or more handshake messages to each of the set of service layers. Further, the method includes determining one or more environmental parameters and determining best possible service layer capable of processing the received request by using a trained service based ML model. The method includes processing the request at the determined best possible service layer and terminating or transferring the secure real time communication session after the request is processed.

20 Claims, 5 Drawing Sheets

Related U.S. Application Data

(60) Provisional application No. 63/121,819, filed on Dec. 4, 2020.

(51) Int. Cl.
  *H04L 41/08* (2022.01)
  *H04L 41/0823* (2022.01)
  *H04L 41/14* (2022.01)
  *H04L 41/16* (2022.01)
  *H04L 41/5019* (2022.01)

(52) U.S. Cl.
  CPC .......... *H04L 41/0886* (2013.01); *H04L 41/14* (2013.01); *H04L 41/5019* (2013.01)

(58) Field of Classification Search
  USPC ........................................................ 709/223
  See application file for complete search history.

(56) References Cited

U.S. PATENT DOCUMENTS

| | | | |
|---|---|---|---|
| 10,999,760 B2 | 5/2021 | Liu et al. | |
| 11,706,101 B2* | 7/2023 | Mishra | H04L 41/0886 709/223 |
| 2018/0089593 A1 | 3/2018 | Patel et al. | |
| 2019/0147362 A1 | 5/2019 | Hayes et al. | |
| 2019/0272373 A1 | 9/2019 | Sadaghiani et al. | |
| 2020/0027022 A1 | 1/2020 | Jha et al. | |
| 2021/0168166 A1 | 6/2021 | Liu et al. | |
| 2022/0182293 A1* | 6/2022 | Mishra | H04L 41/0823 |
| 2023/0308361 A1* | 9/2023 | Mishra | H04L 41/0823 |
| 2024/0098576 A1* | 3/2024 | Khalid | H04W 28/18 |
| 2024/0177001 A1* | 5/2024 | Reed | G06N 3/08 |

OTHER PUBLICATIONS

"U.S. Appl. No. 17/542,646, Response filed Dec. 5, 2022 to Ex Parte Quayle Action mailed Oct. 3, 2022", 9 pgs.

"U.S. Appl. No. 17/542,646, Notice of Allowance mailed Mar. 3, 2023", 11 pgs.

Imran, "A Topical Review on Machine Learning, Software Defined Networking, Internet of Things Applications: Research Limitations and Challenges", <https:/lwww.mdpi.com/2079-9292/10/8/880>, (Apr. 7, 2021).

U.S. Appl. No. 17/542,646, filed Dec. 6, 2021, Distributed, Self-Adjusting and Optimizing Core Network With Machine Learning.

* cited by examiner

ND OPTIMIZING CORE NETWORK WITH MACHINE LEARNING

EARLIEST PRIORITY DATE

This Application is a continuation of U.S. application Ser. No. 17/542,646, filed Dec. 6, 2021, which claims priority from a Provisional patent application filed in the United States of America having Patent Application No. 63/121,819, filed on Dec. 4, 2020, and titled "DISTRIBUTED, LOCAL AND MULTI CLOUD CORE WITH MACHINE LEARNING BASED INTELLIGENCE AND EDGE COMPUTE" each of which is hereby incorporated by reference in its entirety.

FIELD OF INVENTION

Embodiments of the present disclosure relate to computer networking and more particularly relates to a system and a method for dynamically creating distributed, self-adjusting and optimizing core network with machine learning.

BACKGROUND

Generally, various users use internet for accessing one or more services. Conventionally, systems, such as servers and desktops use internet protocol suite (TCP/IP) to communicate with each other on the internet. The internet protocol suite includes multiple layers including application layer, transport layer, internet layer and link layer. The multiple layers of the internet protocol suite collectively work to allow communication between the conventional systems to access the one or more services. However, the conventional systems have a pre-programmed logic to reach each of the multiple layers for accessing the one or more services. The conventional systems use name server to access the one or more service. Thus, the conventional systems experience various issues, such as latency and scalability issues. Further, the conventional systems fail to dynamically determine best layer for accessing the one or more services resulting in increased cost and slow speed of accessing the one or more services. Furthermore, as cloud-based services and user consumption of data grows, operators desire to save cost and provide scalable solutions to the users. Generally, operators, such as American Telephone and Telegraph Company (AT&T), host most of their networking software either locally or on a given cloud provider. However, the conventional systems fail to consider all resources, such as local servers and the cloud server, while accessing the one or more services. Further, the conventional systems are monolithic, heavy weight and centralized systems. The conventional systems are not built for edge centric and distributed networks. Therefore, the conventional systems not suited for cloud native network deployments to meet new network demands. The conventional systems also fail to consider heterogeneity of multiple cloud providers and variance of underlying compute or infrastructure software. Thus, the conventional systems are costly, unscalable, slow and experience throughput and resilience challenges.

Hence, there is a need for an improved system and method for dynamically creating distributed, self-adjusting and optimizing core network with machine learning, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for dynamically creating distributed, self-adjusting and optimizing core network with machine learning is disclosed. The computing system includes one or more hardware processors and a memory coupled to the one or more hardware processors. The memory includes a plurality of modules in the form of programmable instructions executable by the one or more hardware processors. The plurality of modules include a data receiver module configured to receive a request from one or more client devices to access one or more services hosted on one or more external devices. The request includes: type of the one or more client devices, type of network associated with the one or more client devices, subscriber data passing through one of: the one or more client devices and one or more service layers, traffic load on each of the one or more client devices, location of the one or more client devices, underlying cloud infrastructure running the one or more client devices, a set of resources and processor types associated with the underlying cloud infrastructure. The plurality of modules also include a session establishing module configured to establish a secure real time communication session with the one or more client devices and a set of service layers based on the received request. The set of service layers include: one or more discovery layers, one or more control layers and one or more data layers. The set of service layers is associated with at least one or combination of: inter-network and one or more intra-networks. The plurality of modules includes a service parameter determination module configured to determine one or more service parameters associated with the one or more services based on the received request by using a trained service based Machine Learning (ML) model. The one or more service parameters include: type of the one or more services, demand of each of the one or more services and location of the one or more external devices hosting the one or more services. Further, the plurality of modules includes a broadcasting module configured to broadcast one or more handshake messages to each of the set of service layers within at least one of: the inter-network and the one or more intra-networks. The plurality of modules also include an environmental parameter determination module configured to determine one or more environmental parameters associated with each of the set of service layers within the established secure real time communication session based on one or more responses of the broadcasted one or more handshake messages, the received request and the one or more service parameters by using the trained service based ML model. The one or more environmental parameters include: cost, distance to reach each of the set of service layers, latency, green energy, resiliency, a set of external devices peered to each of the set of service layers and a set of compute hosting the set of service layers. Furthermore, the plurality of modules include a layer determination module configured to determine best possible service layer among at least one of: the inter-network and the one or more intra-networks capable of processing the received request within the established secure real time communication session based on the determined one or more environmental parameters, the received request, the one or more service parameters and predefined priority of each of the one or more client devices by using the trained service based ML model. The plurality of modules further include a request processing module configured to process the received request at the determined best possible service layer. Further, the plurality of modules include a session management module configured to perform one of: terminate and transfer the established secure real time communication session after the received request is processed.

In accordance with another embodiment of the present disclosure, a method for dynamically creating distributed, self-adjusting and optimizing core network with machine learning is disclosed. The method includes receiving a request from one or more client devices to access one or more services hosted on one or more external devices. The request includes type of the one or more client devices, type of network associated with the one or more client devices, subscriber data passing through one of: the one or more client devices and one or more service layers, traffic load on each of the one or more client devices, location of the one or more client devices, underlying cloud infrastructure running the one or more client devices, a set of resources and processor types associated with the underlying cloud infrastructure. The method also includes establishing a secure real time communication session with the one or more client devices and a set of service layers based on the received request. The set of service layers include: one or more discovery layers, one or more control layers and one or more data layers. The set of service layers is associated with at least one or combination of: inter-network and one or more intra-networks. The method further includes determining one or more service parameters associated with the one or more services based on the received request by using a trained service based Machine Learning (ML) model. The one or more service parameters include: type of the one or more services, demand of each of the one or more services and location of the one or more external devices hosting the one or more services. Further, the method includes broadcasting one or more handshake messages to each of the set of service layers within at least one of: the inter-network and the one or more intra-networks. Also, the method includes determining one or more environmental parameters associated with each of the set of service layers within the established secure real time communication session based on one or more responses of the broadcasted one or more handshake messages, the received request and the one or more service parameters by using the trained service based ML model. The one or more environmental parameters comprise: cost, distance to reach each of the set of service layers, latency, green energy, resiliency, a set of external devices peered to each of the set of service layers and a set of compute hosting the set of service layers. Furthermore, the method includes determining best possible service layer among at least one of: the inter-network and the one or more intra-networks capable of processing the received request within the established secure real time communication session based on the determined one or more environmental parameters, the received request, the one or more service parameters and predefined priority of each of the one or more client devices by using the trained service based ML model. The method also includes processing the received request at the determined best possible service layer. Further, the method includes performing one of: terminating and transferring the established secure real time communication session after the received request is processed.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1A:
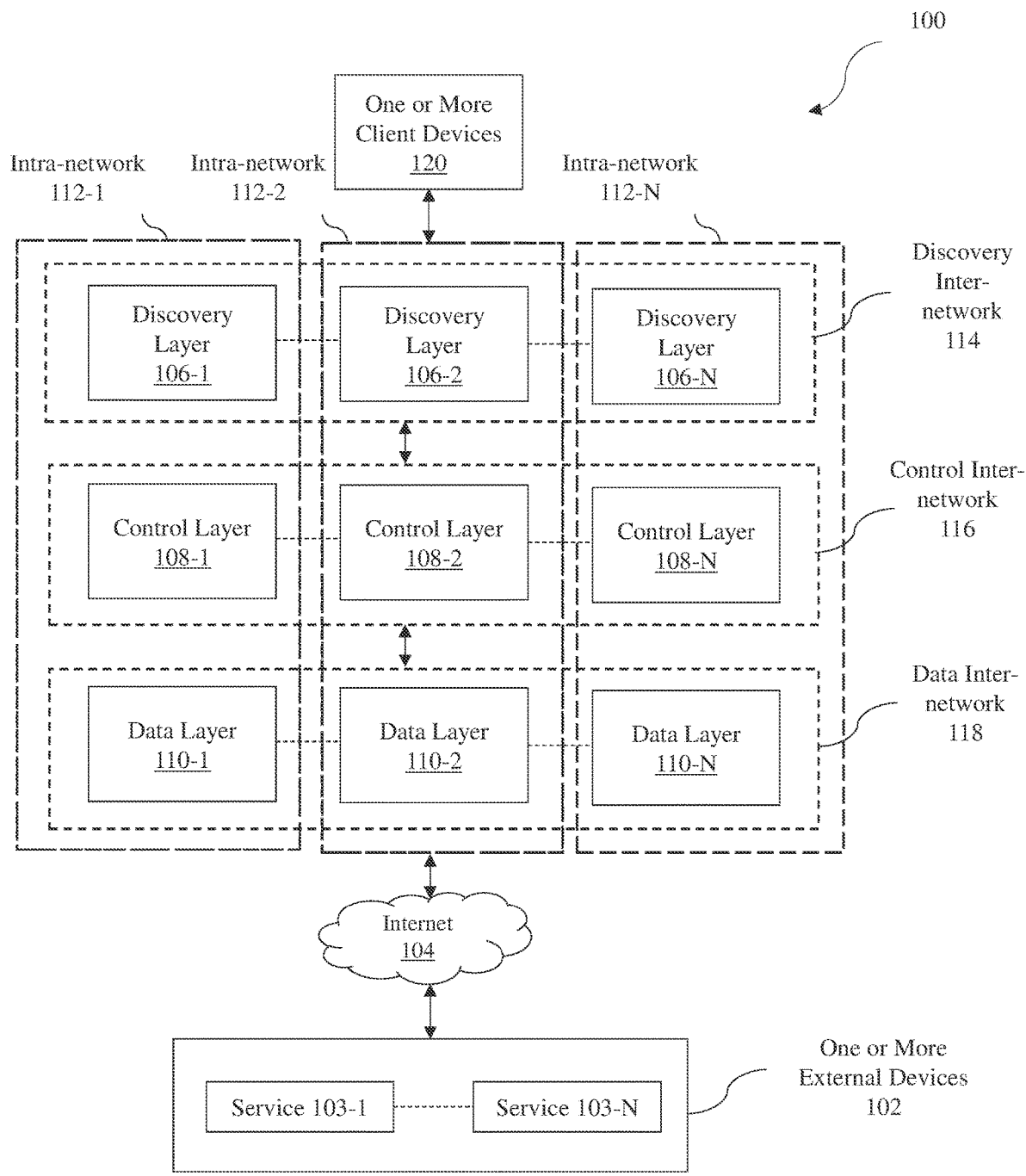
FIG. 1A is a block diagram illustrating an exemplary computing environment for dynamically creating distributed, self-adjusting and optimizing core network with machine learning, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises" a" does not, without more constraints, preclude the existence of other devices, sub-systems, additional sub-modules. Appearances of the phra"e "in an embodim"nt", "in another embodim"nt" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations, in another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1A through FIG. 3B, where similar reference characters denote corresponding features consistently throughout the figures, there are shown preferred embodiments and these embodiments are described in the context of the following exemplary system and/or method.

FIG. 1A is a block diagram illustrating an exemplary computing environment 100 for dynamically creating distributed, self-adjusting and optimizing core network with machine learning, in accordance with an embodiment of the present disclosure. In an embodiment, the 'computing environment' 100 may be a self-adjusting and optimizing core network comprising core nodes capable of implementing the method steps of the present disclosure. The computing environment 100 may be any processing environment comprising resources, software and hardware combination to implement the present disclosure. According to FIG. 1A, the computing environment 100 includes one or more external devices 10:2 communicatively coupled to a set of service layers via internet 104. The one or more external devices 102 is configured to host one or more services 103-1 . . . 103-N accessible by the set of service layers. For the sake of present description, the one or more services 103-1 . . . 103-N have been represented as the one or more services 103. In an exemplary embodiment of the present disclosure, the one or more services 103 include Netflix, YouTube and the like. In an embodiment of the present disclosure, the one or more services 103 are wireless and wireline services. In an exemplary embodiment of the present disclosure, the one or more external devices 102 may be proxy servers or cache servers. Further, each of the set of service layers may act as a computing system including a plurality of modules. Details on the computing system and the plurality of modules have been elaborated in subsequent paragraphs of the present description with reference to FIG. 2.

Further, the set of service layers include one or more discovery layers 106-1, 106-2 . . . 106-N, one or inure control layers 108-1, 108-2 . . . 108-N and one or more data layers 110-1, 110-2 . . . 110-N. For the sake of present description, the one or more discovery layers 106-1, 106-2 . . . 106-N have been represented as the one or more discovery layers 106, the one or more control layers 108-1, 108-2 . . . 108-N have been represented as the one or more control layers 108 and the one or more data layers 110-1, 110-2 . . . 110-N have been represented as the one or more data layers 110. In an embodiment of the present disclosure the one or more discovery layers 106, the one or more control layers 108 and the one or more data layers 110 forms a multicore to access the one or more services 103. In an embodiment of the present disclosure, the set of service layers is associated with inter-network, one or more intra-networks 112-1, 112-2 . . . 112-N or a combination thereof. For the sake of present description, the one or more intra-networks 112-1, 112-2 . . . 112-N have been represented as the one or more intra-networks 112. In an embodiment of the present disclosure, the inter-network and the one or more intra-networks 112 are secured networks. In an embodiment of the present disclosure, the inter-network and the one or more intra-networks form an autonomous, distributed and decentralized communication network. In an embodiment of the present disclosure, the one or more discovery layers 106, the one or more data layers 110 and the one or more control layers 108 of the autonomous, distributed and decentralized communication network may include one or more mobile network functions. In an exemplary embodiment of the present disclosure, the one or more mobile network functions may include Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Access & Mobility Management Function (AMF), Session Management Function (SMF), User Plane Function (UNF), Network Slicing Selection Function (NSSF), Network Repository Functions (NRF), Network Data Analytics Function (NWDAF), Non-3GPP Interworking Function (N3IWF), Unified Data Management (UDM), User Defined Routes (UDR), Authentication Server Function (AUSF), Point Coordination Function (PCF), Network Exposure Function (NEF), Application Function (AF), GiLAN, Inline services, NG-Radio Access Network (RAN) Centralized Unit (CU), Call Session Control Function (CSCE), Telephony Application Server (TAS), Rich Communication Services (RCS), Content Data Network (CDN) or any combination thereof. The one or more intra-networks 112 includes a set of the one or more discovery layers 106, the one or more control layers 108 and the one or more data layers 110 communicatively coupled with each other, as shown in FIG. 1A. For example, the intra-network 112-1 facilitates communicative coupling of the discovery layer 106-1, the control layer 108-1 and data layer 110-1. The intra-network 112-2 facilitates communicative coupling of the discovery layer 106-2, the control layer 108-2 and data layer 110-2. The intra-network 112-N facilitates communicative coupling of the discovery layer 106-N, the control layer 108-N and data layer 110-N. Furthermore, the inter-network includes a discovery inter-network 114, a control inter-network 116 and a data inter-network 118. The discovery inter-network 114 includes a geographical distribution of the one or more discovery layers 106 communicatively coupled with each other. Further, the control inter-network 116 includes a geographical distribution of the one or more control layers 108 communicatively coupled with each other. The data inter-network 118 includes a geographical distribution of the one or more data layers 110 communicatively coupled with each other. In an embodiment of the present disclosure, each of the set of service layers corresponds to a group of network components hosted on one or more resources. The one or more resources include one or more local servers, one or more cloud servers or a combination thereof. Further, the set of service layers are synchronized with each other. In an embodiment of the present disclosure, each of the set of service layers may be configured to provide a specific set of services to one or more client devices 120. For example, a discovery layer from the one or more discovery layers 106 may be configured to provide service 1, service 2 and service 3 to the one or more client devices 120. Similarly, a control layer from the one or more control layers 108 may be configured to provide service 4, service 5 and service 6 to the one or more client devices 120.

Furthermore, the computing environment 100 includes the one or more client devices 120 connected to the set of service layers via a private network. The one or more client devices 120 may access the one or more services 103 hosted on the one or more external devices 102 via the set of service layers. In an exemplary embodiment of the present disclosure, the one or more services 103 may be locally hosted services or internet hosted services. In an embodiment of the present disclosure, the one or more client devices 120 may be programmed with service discovery layer information to discover the set of service layers for accessing the one or more services 103. In another embodiment of the present disclosure, the one or more client devices 120 may discover the set of service layers by using one or more mechanism, such as Domain Name System (DNS). In an exemplary embodiment of the present disclosure, the one or more client devices 120 may include one or more mobile network functions, such as SGW, PGW, ePDG, TWAG, N3IWF, NWDAF or UPF, CDN and the like.

In an embodiment of the present disclosure, the computing system is configured to receive a request from the one or more client devices 120 to access the one or more services 103 hosted on the one or more external devices 102. Further, the computing system establishes a secure real time communication session with the one or more client devices 120 based on the received request. The computing system determines one or more service parameters associated with the one or more services 103 based on the received request by using a trained service based Machine Learning (ML) model. Furthermore, the computing system broadcasts one or more handshake messages to each of the set of service layers within the inter-network, the one or more intra-networks 112 or a combination thereof. The computing system determines one or more environmental parameters associated with each of the set of service layers within the established secure real time communication session based on one or more responses of the broadcasted one or more handshake messages, the received request and the one or more service parameters by using the trained service based ML model. The computing system also determines best possible service layer among the inter-network, the one or more intra-networks 112 or a combination thereof capable of processing the received request within the established secure real time communication session based on the determined one or more environmental parameters, the received request, the one or more service parameters and predefined priority of each of the one or more client devices 120 by using the trained service based ML model. Further, the computing system processes the received request at the determined best possible service layer. The computing system terminates or transfers the established secure real time communication session after the received request is processed. In an embodiment of the present disclosure, the computing system may include a software which may either be loaded onto a computer or accessed by the computer. In an exemplary embodiment of the present disclosure, the computer may include a general-purpose server in data center, laptop computer, desktop computer, tablet computer and the like. The loaded software may include an application on the computer. The software may be accessed by the computer using a web browser. The computer may access the software via the web browser using the internet, extranet, intranet, host server, internet cloud and the like.

Figure 1B:
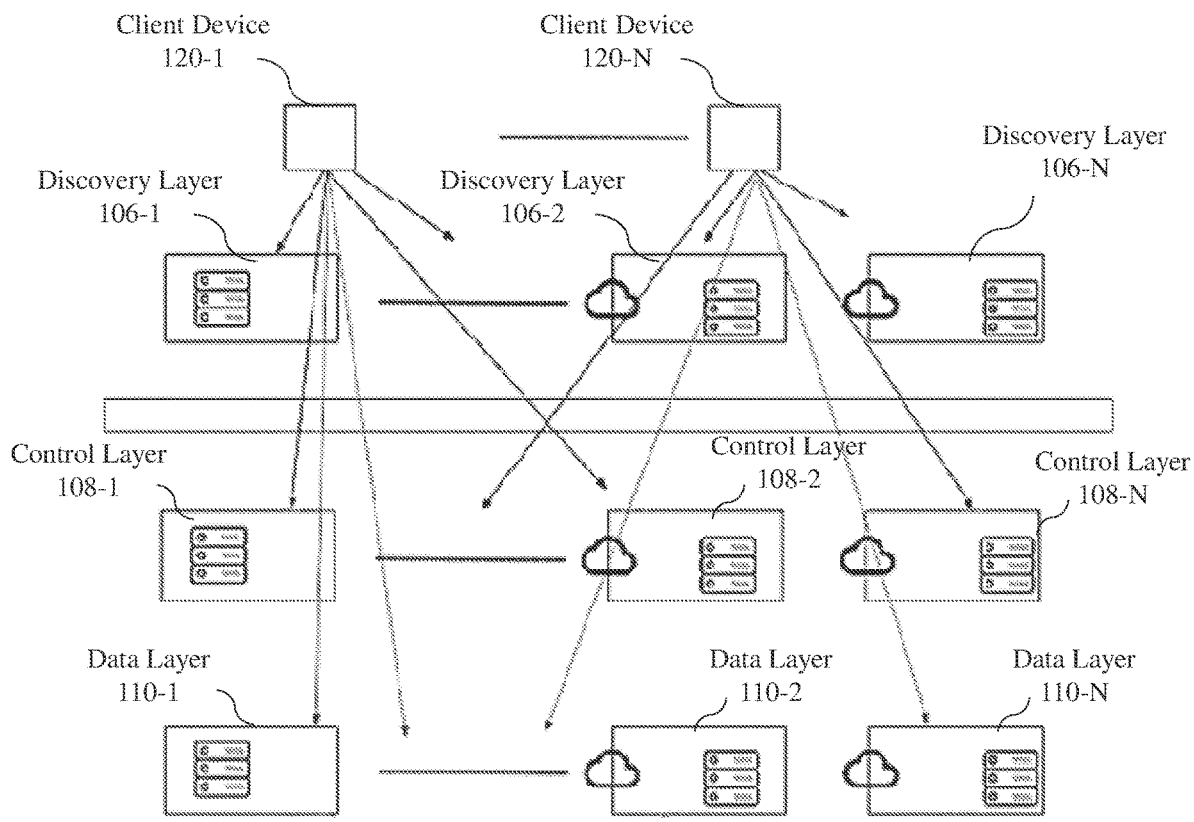
FIG. 1B is a block diagram illustrating an exemplary computing environment for dynamically creating the distributed, self-adjusting and optimizing core network with the machine learning, in accordance with another embodiment of the present disclosure.

FIG. 1B is a block diagram illustrating an exemplary computing environment for dynamically creating the distributed, self-adjusting and optimizing core network with the machine learning, in accordance with another embodiment of the present disclosure. The computing environment 100 includes the one or more client devices 120-1 . . . 120-N. For the sake of present description, the one or more client devices 120-1 . . . 120-N have been represented as the one or more one or more client devices 120. The one or more client devices 120 are connected to the set of service layers via the private network for accessing the one or more services 103. For example, the client device 120-1 is connected to the discovery layer 106-1, the discovery layer 106-2, the control layer 108-1, the control layer 108-2, the data layer 110-1 and the data layer 110-2. Further, the client device 120-N is connected to the discovery layer 106-2, the discovery layer 106-N, the control layer 108-2, the control layer 108-N, the data layer 110-2 and the data layer 110-N.

Figure 2:
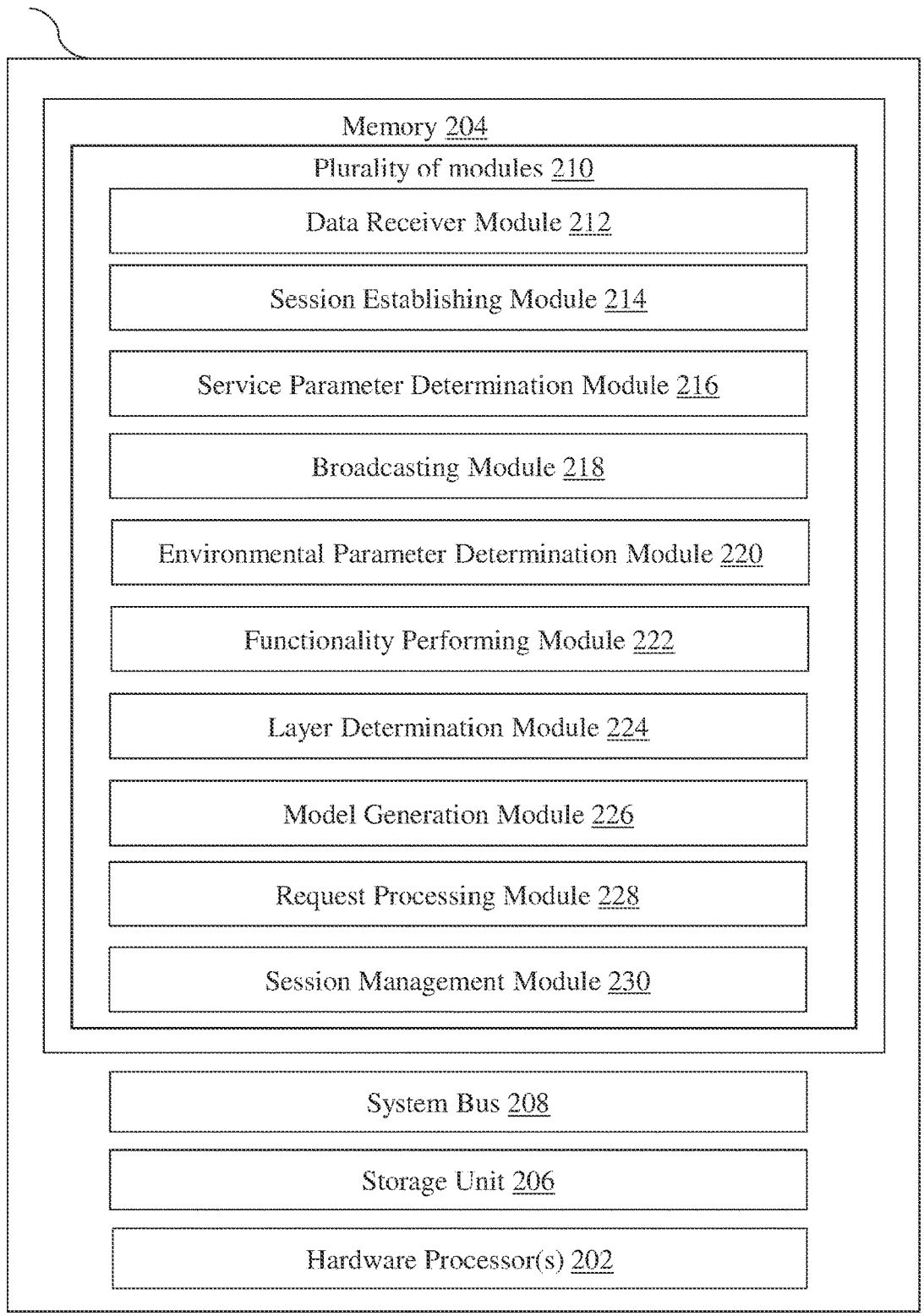
FIG. 2 is a block diagram illustrating an exemplary computing system for dynamically creating the distributed, self-adjusting and optimizing core network with the machine learning, in accordance with an embodiment of the present disclosure.

FIG. 2 is a block diagram illustrating an exemplary computing system 200 for dynamically creating the distributed, self-adjusting and optimizing core network with the machine learning. In an embodiment of the present disclosure, the computing system 200 corresponds to a group of network components hosted on the one or more resources. In an exemplary embodiment of the present disclosure, the one or more resources include the one or more local servers, the one or more cloud servers or a combination thereof. The computing system 200 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 210 in the form of programmable instructions executable by the one or more hardware processors 202. Further, the plurality of modules 210 includes a data receiver module 212, a session establishing module 214, a service parameter determination module 216, a broadcasting module 218, an environmental parameter determination module 220, a functionality performing module 222, a layer determination module 224, a model generation module 226, a request processing module 228 and a session management module 230.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 210 stored in the form of machine-readable instructions on any of the above-mentioned storage media and may be in communication with and executed by the one or more hardware processors 202.

The storage unit 206 may be a cloud storage. The storage unit 206 may store the request, the one or more service parameters and the one or more environmental parameters. The storage unit 206 may also store one or more client parameters and the predefined priority of each of the one or more client devices 120.

The data receiver module 212 is configured to receive the request from the one or more client devices 120 to access the one or more services 103 hosted on the one or more external devices 102. In an embodiment of the present disclosure, the one or more services 103 are wireless and wireline services. In an exemplary embodiment of the present disclosure, the request include type of the one or more client devices 120, type of network associated with the one or more client devices 120, subscriber data passing through one of: the one or more client devices 120 and one or more service layers, traffic load on each of the one or more client devices 120, location of the one or more client devices 120, underlying cloud infrastructure running the one or more client devices 120, a set of resources, processor types associated with the underlying cloud infrastructure and the like. The one or more client devices 120 include one or more mobile network functions. In an exemplary embodiment of the present disclosure, the one or more mobile network functions may include Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Access & Mobility Management Function (AMF), Session Management Function (SMF), User Plane Function (UPF), Network Slicing Selection Function (NSSF), Network Repository Functions (NRF), Network Data Analytics Function (NWDAF), Non-3GPP Interworking Function (N3-IWF), Unified Data Management (UDM), User Defined Routes (UDR), Authentication Server Function (AUSF), Point Coordination Function (PCF), Network Exposure Function (NEF), Application Function (AF), GiLAN, Inline services, NG-Radio Access Network (RAN), Centralized Unit (CU), Call Session Control Function (CSCF), Telephony Application Server (TAS), Rich Communication Services (RCS), Content Data Network (CDN) or any combination thereof. In an exemplary embodiment of the present disclosure, the type of network associated with the one or more client devices 120 may include 4G network, 5G network and the like. In an exemplary embodiment of the present disclosure, the one or more external devices 102 may be proxy servers or cache servers. In an embodiment of the present disclosure, the compute represents that the set of service layers may run in any cloud infrastructure, such as Amazon Web Service (AWS), Azure, VMware platform, red hat OpenShift platform and the like. In an exemplary embodiment of the present disclosure, the processor types may correspond to one or more processors, such as intel processors, serverless software and the like. The set of resources include memory, processing power, networking capabilities and the like. In an exemplary embodiment of the present disclosure, the processor types may include x86, Advanced RISC Machines (ARM), Advanced Micro Devices (AMD), M1 or any variants of these. The subscriber is a user equipment, such as handset, tablet, smart watch and the like capable of initiating a data browsing session or phone call.

The session establishing module 214 is configured to establish the secure real time communication session with the one or more client devices 120 and the set of service layers based on the received request. In an embodiment of the present disclosure, each of the set of service layers corresponds to the group of network components hosted on the one or more resources. In an embodiment of the present disclosure, the set of service layers include the one or more discovery layers 106, the one or more control layers 108 and one or more data layers 110. In an embodiment of the present disclosure the one or more discovery layers 106, the one or more control layers 108 and the one or more data layers 110 forms a multicore to access the one or more services 103. Further, the set of service layers is associated with the inter-network, the one or more intra-networks 112 or a combination thereof. In an embodiment of the present disclosure, the inter-network and the one or more intra-networks form an autonomous, distributed and decentralized communication network. In an embodiment of the present disclosure, the one or more discovery layers 106, the one or more data layers 110 and the one or more control layers 108 of the autonomous, distributed and decentralized communication network may include the one or more mobile network functions. The one or more intra-networks 112 includes the set of the one or more discovery layers 106, the one or more control layers 108 and the one or more data layers 110 communicatively coupled with each other. Furthermore, the inter-network includes geographical distribution of each of the one or more discovery layers 106, the one or more control layers 108 and the one or more data layers 110 in a network. In an embodiment of the present disclosure, the inter-network includes the discovery inter-network 114, the control inter-network 116 and the data inter-network 118. The discovery inter-network 114 includes a geographical distribution of the one or more discovery layers 106 communicatively coupled with each other. Further, the control inter-network 116 includes a geographical distribution of the one or more control layers 108 communicatively coupled with each other. The data inter-network 118 includes a geographical distribution of the one or more data layers 110 communicatively coupled with each other. In an embodiment of the present disclosure, the set of service layers are seamlessly synchronized with each other. In an exemplary embodiment of the present disclosure, the set of service layers and the one or more client devices 120 may be connected by using block chain technology for secure communication and data access. In an exemplary embodiment, the computing system 200 may create a digital twin of the inter-network and the one or more intra-networks 112 for further improvements and extendibility.

The service parameter determination module 216 is configured to determine the one or more service parameters associated with the one or more services 103 based on the received request by using the trained service based Machine Learning (ML) model. In an exemplary embodiment of the present disclosure, the one or more service parameters include type of the one or more services 103, demand of each of the one or more services 103, location of the one or more external devices 102 hosting the one or more services 103 and the like. In an exemplary embodiment of the present disclosure, the type of the one or more services 103 includes locally hosted services and internet hosted services.

The broadcasting module 218 is configured to broadcast the one or more handshake messages to each of the set of service layers within the inter-network, the one or more intra-networks 112 or a combination thereof. In an embodiment of the present disclosure, broadcasting the one or more handshake messages to each of the set of service layers allows the one or more client devices 120 to seamlessly connect with the set of service layers for accessing the one or more services 103. Furthermore, since, the one or more handshake messages are broadcasted to each of the set of service layers within the inter-network, the one or more intra-networks 112 or a combination thereof, each of the set of service layers includes sufficient information to process the received request. In an exemplary embodiment of the present disclosure, the one or more handshake messages include the received request, the one or more service parameters and the like.

The environmental parameter determination module 220 is configured to determine the one or more environmental parameters associated with each of the set of service layers within the established secure real time communication session based on one or more responses of the broadcasted one or more handshake messages, the received request and the one or more service parameters by using the trained service based ML model. In an exemplary embodiment of the present disclosure, the one or more environmental parameters include cost, distance to reach each of the set of service layers, latency, green energy, resiliency, a set of external devices peered to each of the set of service layers, a set of compute hosting the set of service layers and the like. The one or more responses of the broadcasted one or more handshake messages include state, configuration of each of the set of service layers, security information, subscriber data passing through the one or more client devices or one or more service layers, traffic load on each of the one or more client devices 120 and information associated with the one or more environmental parameters and the like. In an exemplary embodiment of the present disclosure, the security information includes governance compliance, risk factors and the like.

The functionality performing module 222 is configured to perform one or more functionalities by using the trained service based ML model to optimize the determined one or more environmental parameters. In an exemplary embodiment of the present disclosure, the one or more functionalities include security, authentication, load distribution, cloud infrastructure resources and capabilities, routing, latency, capacity, redundancy, resilience of the established secure real time communication session and the like. In an embodiment of the present disclosure, the one or more functionalities may also facilitate determination of the best possible service layer.

The layer determination module 224 is configured to determine best possible service layer among the inter-network, the one or more intra-networks 112 or a combination thereof capable of processing the received request within the established secure real time communication session based on the determined one or more environmental parameters, the received request, the one or more service parameters and the predefined priority of each of the one or more client devices 120 by using the trained service based ML, model. In an embodiment of the present disclosure, the determined best possible service layer is nearby to the one or more external devices 102 hosting the one or more services 103. For example, when a discovery layer from the one or more discovery layers 106 acts as the computing system 200 and receives the request, the discover layer determines different discovery layer from the one or more discovery layers 106 within the discovery inter-network 114, a control layer from the one or more control layers 108 or a data layer from the one or more data layers 110 as the best service layer for processing the received request. In an embodiment of the present disclosure, the layer determination module 224 may also determine one or more intermediate service layers, such that the determined one or more intermediate service layers may further determine the best possible service layer for processing the received request. In an exemplary embodiment of the present disclosure, the one or more intermediate layers may include discovery layers, control layers, data layers or any combination thereof. Further, the best possible service layer may be any discovery layer from the one or more discovery layers 106, any control layer from the one or more control layers 108, any data layer from the one or more data layers 110. For example, when the discovery layer acts as the computing system 200 and receives the request, the discover layer determines different discovery layer within the discovery inter-network 114 as intermediate service layer. Further, the different discovery layer determines the control layer as another intermediate service layer. The control layer determines the data layer as the best possible service layer for processing the received request. In another example of a 4G network, a client device requests a discovery layer to access the one or more services 103. Further, the discovery layer determines a control layer i.e., Mobility Management Entity (MME), as intermediate service layer. The control layer determines a data layer i.e., Serving-Gateway, as the best possible service layer, such that the service layer processes the request. In an embodiment of the present disclosure, one or more service layers from the set of service layers may be statically configured on the one or more client devices 120, such that the one or more service layers may be skipped in a call flow sequence while accessing the one or more services 103.

Further, in determining the best possible service layer capable of processing the received request within the established secure real time communication session based on the determined one or more environmental parameters, the received request, the one or more service parameters and the predefined priority of each of the one or more client devices 120 by using the trained service based ML model, the layer determination module 224 determines one or more client parameters based on the received request, the one or more service parameters and the one or more responses of the broadcasted one or more handshake messages by using the trained service based ML model. In an exemplary embodiment of the present disclosure, the one or more client parameters include the state, the configuration of each of the set of service layers, the security information, subscriber data passing through the one or more client devices or one or more service layers, alarm information and next service layer information. In an exemplary embodiment of the present disclosure, the alarm information include information corresponding to physical faults in service layers, temperature of data centers, solar enabled data centers, storage of the data centers and the like. Further, the layer determination module 224 determines the best possible service layer capable of processing the received request within the established secure real time communication session based on the determined one or more environmental parameters, the received request, the one or more service parameters, the predefined priority of each of the one or more client devices 120 and the determined one or more client parameters by using the trained service based ML model. In an embodiment of the present disclosure, the one or more client parameters facilitates determination of the one or more intermediate layers. In an embodiment of the present disclosure, the layer determination module 224 may also consider location of the set of service layers to determine the best possible service layer, such that the determined best possible layer may have most optimal location.

In an embodiment of the present disclosure, before using the trained service based ML model, the trained service based ML model is required to be generated. The model generation module 226 correlates the received request, the one or more service parameters, the one or more environmental parameters, one or more client parameters and the predefined priority of each of the one or more client devices 120 with each other. Further, the model generation module 226 generates the trained service based ML model based on result of correlation.

The request processing module 228 is configured to process the received request at the determined best possible service layer. In an embodiment of the present disclosure, processing the request includes executing the one or more services 103 at the one or more client devices 120. In executing the one or more services 103 at the one or more client devices 120, the request processing module 228 fetches content of the one or more services 103 from the one or more external devices 102 and executes the fetched content on the one or more client devices 120.

The session management module 230 is configured to terminate or transfer the established secure real time communication session after the received request is processed. In an exemplary embodiment of the present disclosure, the established secure real time communication session is transferred from one location to another location to enable service continuity.

In an embodiment of the present disclosure, the trained service based ML model performs reinforcement learning based on the received request, the one or more environmental parameters, the one or more service parameters, the one or more client parameters and the determined best possible service layer. The reinforcement learning may be performed online, offline or a combination thereof. In an embodiment of the present disclosure, the reinforcement learning improves accuracy of the trained service based ML model. Further, the one or more client parameters associated with known client devices and requests associated with the known client devices are used as validation data sets to evaluate performance of the trained service based ML model. The trained service based ML model may be uploaded onto each of the set of layers periodically. In an embodiment of the present disclosure, each of the one or more discovery layers 106, the one or more control layers 108 and the one or more data layers 110 may have different trained service based ML model.

Further, operation of the computing system 200 is explained with the help of various use case scenarios. In a use case scenario, when a discovery layer from the one or more discovery layers 106 is acting as the computing system 200, the discovery layer receives a request from a client device to access a service hosted on an external device. Furthermore, the discovery layer establishes a secure real time communication session with the client device and the set of service layers based on the received request. The discovery layer also determines the one or more service parameters associated with the service based on the received request by using the trained service based ML model. Further, the discovery layer broadcasts one or more handshake messages to each of the set of service layers within the inter-network and the one or more intra-networks 112, The discovery layer also determines the one or more environmental parameters associated with each of the set of service layers within the established secure real time communication session based on one or more responses of the broadcasted one or more handshake messages, the received request and the one or more service parameters by using the trained service based ML model. Furthermore, the discovery layer determines different discovery layer among the discovery inter-network 114 capable of processing the received request within the established secure real time communication session based on the determined one or more environmental parameters, the received request, the one or more service parameters and the predefined priority of the client device by using the trained service based ML model. The different discovery layer processes the received request. Further, the different discovery layer terminates or transfers the established secure real time communication session after the received request is processed.

In another use case scenario, when a control layer from the one or more control layers 108 is acting as the computing system 200, the control layer receives a request from a client device to access a service hosted on an external device. Further, the control layer establishes a secure real time communication session with the client device and the set of service layers based on the received request. The control layer also determines the one or more service parameters associated with the service based on the received request by using the trained service based ML model. Furthermore, the control layer broadcasts one or more handshake messages to each of the set of service layers within the inter-network and the one or more intra-networks 112. The control layer also determines the one or more environmental parameters associated with each of the set of service layers within the established secure real time communication session based on one or more responses of the broadcasted one or more handshake messages, the received request and the one or more service parameters by using the trained service based ML model. Further, the control layer determines a discovery layer among the one or more intra-networks 112 as intermediate service layer within the established secure real time communication session based on the determined one or more environmental parameters, the received request, the one or more service parameters and the predefined priority of the client device by using the trained service based ML model. The discovery layer determines a different control layer from the one or more control layers 108 as intermediate service layer within the established secure real time communication session based on the determined one or more environmental parameters, the received request, the one or more service parameters and the predefined priority of the client device by using the trained service based ML model. The different control layer determines a data layer from the one or more data layers 110 as best possible service layer capable of processing the received request within the established secure real time communication session based on the determined one or more environmental parameters, the received request, the one or more service parameters and the predefined priority of each of the one or more client devices 120 by using the trained service based ML model. Furthermore, the data layer processes the received request by fetching content of the service from the external device and executing the fetched content on the client device. The data layer terminates or transfers the established secure real time communication session after the received request is processed.

Figure 3A:
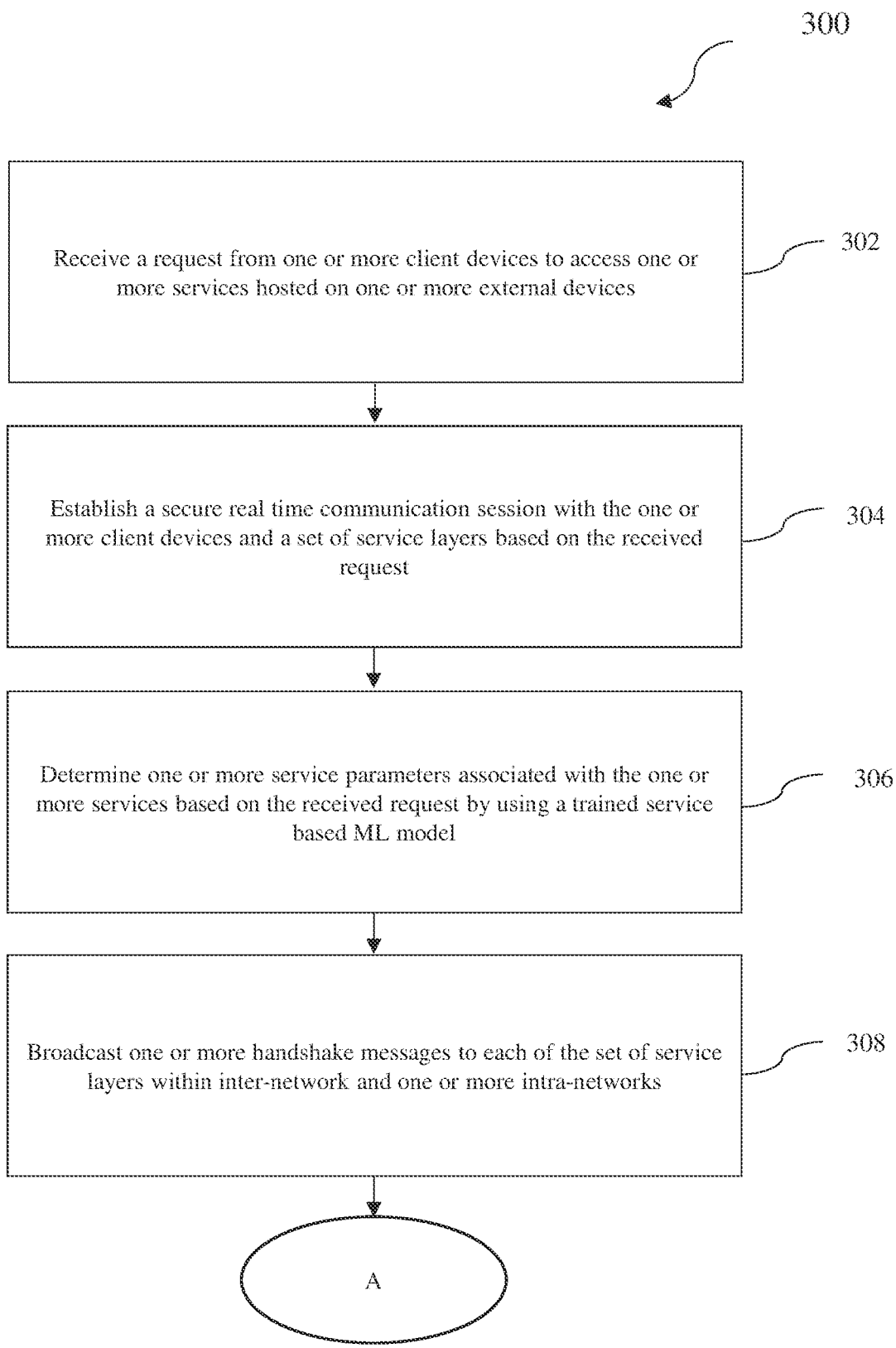
FIGS. 3A-3B are process flow diagrams illustrating an exemplary method for dynamically creating the distributed, self-adjusting and optimizing core network with the machine learning, in accordance with an embodiment of the present disclosure.
Figure 3B:
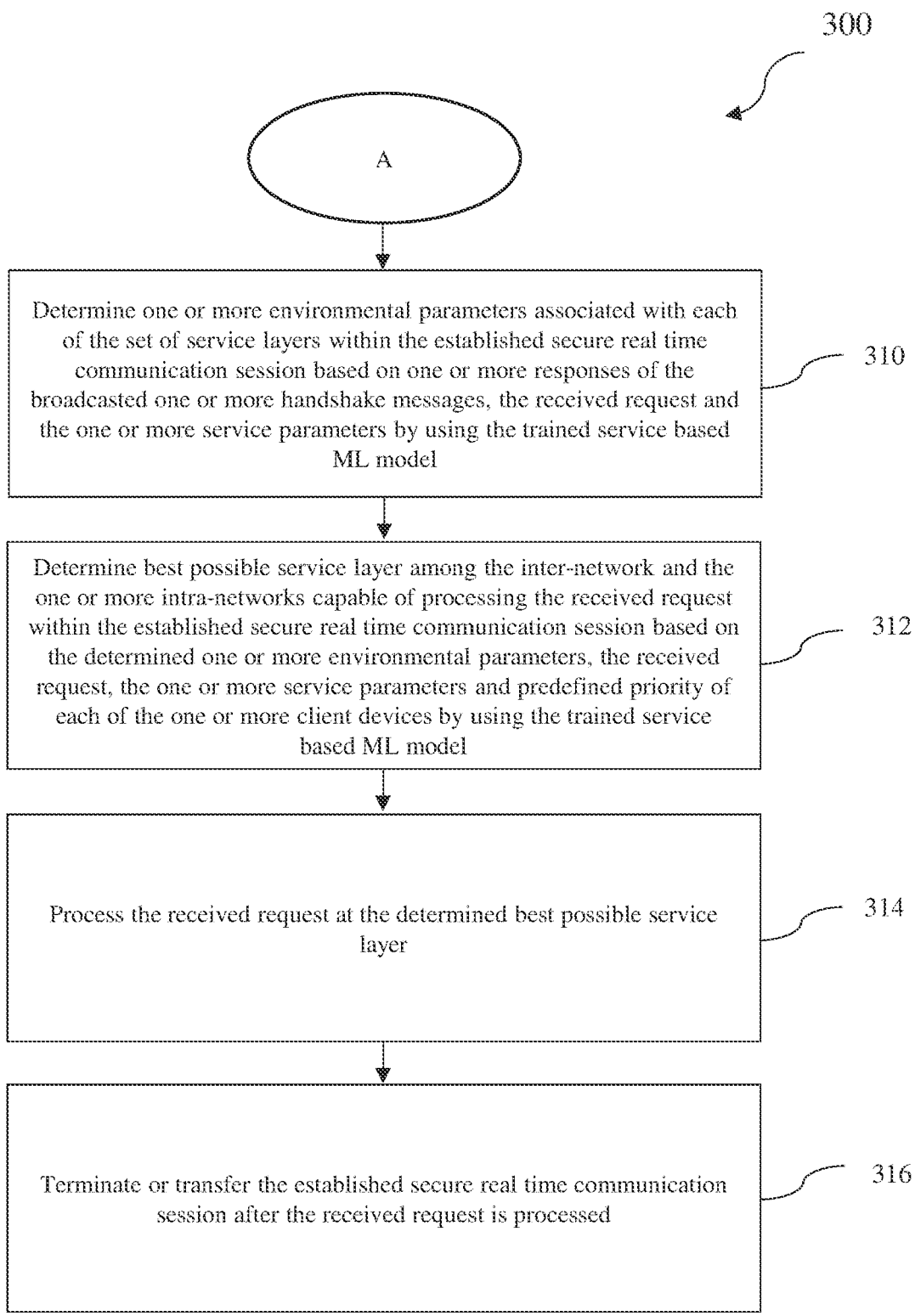

FIG. 3A-3B are process flow diagrams illustrating an exemplary method 300 for dynamically creating distributed, self-adjusting and optimizing core network with machine learning, in accordance with an embodiment of the present disclosure. In an embodiment of the present disclosure, the method 300 may be performed by a service layer. The service layer corresponds to a group of network components hosted on one or more resources. In an exemplary embodiment of the present disclosure, the one or more resources include one or more local servers, one or more cloud servers or a combination thereof. At step 302, a request is received from one or more client devices 120 to access one or more services 103 hosted on one or more external devices 102. In an embodiment of the present disclosure, the one or more services 103 are wireless and wireline services. In an exemplary embodiment of the present disclosure, the request include type of the one or more client devices 120, type of network associated with the one or more client devices 120, subscriber data passing through the one or more client devices or one or more service layers, traffic load on each of the one or more client devices 120, location of the one or more client devices 120, underlying cloud infrastructure running the one or more client devices 120, a set of resources, processor types associated with the underlying cloud infrastructure and the like. The one or more client devices 120 include one or more mobile network functions. In an exemplary embodiment of the present disclosure, the one or more mobile network functions may include Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Access & Mobility Management Function (AMF), Session Management Function (SMF), User Plane Function (IMF), Network Slicing Selection Function (NSSF), Network Repository Functions (NRF), Network Data Analytics Function (NWDAF), Non-3GPP Interworking Function (N3IWF), Unified Data Management (UDM), User Defined Routes (UDR), Authentication Server Function (AUSF), Point. Coordination Function (PCF), Network Exposure Function (NEF), Application Function (AF), GiLAN, Inline services, NG-Radio Access Network (RAN) Centralized Unit (CU), Call Session Control Function (CSCF), Telephony Application Server (TAS), Rich Communication Services (RCS), CDN (content data network) or any combination thereof. In an exemplary embodiment of the present disclosure, the type of network associated with the one or more client devices 120 may include 4G network, 5G network and the like. In an exemplary embodiment of the present disclosure, the one or more external devices 102 may be proxy servers or cache servers. In an embodiment of the present disclosure, the compute represents that the set of service layers may run in any cloud infrastructure, such as Amazon Web Service (AWS), Azure, VMware platform, red hat OpenShift platform and the like. In an exemplary embodiment of the present disclosure, the processor types may correspond to one or more processors, such as intel processors, serverless software and the like. The set of resources include memory, processing power, networking capabilities and the like. The set of resources include memory, processing power, networking capabilities and the like. In an exemplary embodiment of the present disclosure, the processor types may include x86, Advanced RISC Machines (ARM), Advanced Micro Devices (AMD), M1 or any variants of these. The subscriber is a user equipment, such as handset, tablet, smart watch and the like capable of initiating a data browsing session or phone call.

At step 304, a secure real time communication session is established with the one or more client devices 120 and a set of service layers based on the received request. In an embodiment of the present disclosure, each of the set of service layers corresponds to a group of network components hosted on one or more resources. In an embodiment of the present disclosure, the set of service layers include one or more discovery layers 106, one or more control layers 108 and one or more data layers 110. In an embodiment of the present disclosure the one or inure discovery layers 106, the one or more control layers 108 and the one or more data layers 110 forms a self-adjusting and optimizing core network to access the one or more services 103. Further, the set of service layers is associated with inter-network, one or more intra-networks 112 or a combination thereof. In an embodiment of the present disclosure, the inter-network and the one or more intra-networks form an autonomous, distributed and decentralized communication network. In an embodiment of the present disclosure, the one or more discovery layers 106, the one or more data layers 110 and the one or more control layers 108 of the autonomous, distributed and decentralized communication network may include the one or more mobile network functions. The one or more intra-networks 112 includes a set of the one or more discovery layers 106, the one or more control layers 108 and the one or more data layers 110 communicatively coupled with each other. Furthermore, the inter-network includes geographical distribution of each of the one or more discovery layers 106, the one or more control layers 108 and the one or more data layers 110 in a network. In an embodiment of the present disclosure, the inter-network includes discovery inter-network 114, control inter-network 116 and data inter-network 118. The discovery inter-network 114 includes a geographical distribution of the one or more discovery layers 106 communicatively coupled with each other. Further, the control inter-network 116 includes a geographical distribution of the one or more control layers 108 communicatively coupled with each other. The data inter-network 118 includes a geographical distribution of the one or more data layers 110 communicatively coupled with each other. In an embodiment of the present disclosure, the set of service layers are seamlessly synchronized with each other. In an exemplary embodiment of the present disclosure, the set of service layers and the one or more client devices 120 may be connected by using block chain technology for secure communication and data access. In an exemplary embodiment, the a digital twin of the inter-network and the one or more intra-networks 112 may be created for further improvements and extendibility.

At step 306, one or more service parameters associated with the one or more services 103 are determined based on the received request by using a trained service based Machine Learning (ML) model. In an exemplary embodiment of the present disclosure, the one or more service parameters include type of the one or more services 103, demand of each of the one or more services 103, location of the one or more external devices 102 hosting the one or more services 103 and the like. In an exemplary embodiment of the present disclosure, the type of the one or more services 103 includes locally hosted services and internet hosted services.

At step 308, one or more handshake messages are broadcasted to each of the set of service layers within the inter-network, the one or more intra-networks 112 or a combination thereof. In an embodiment of the present disclosure, broadcasting the one or more handshake messages to each of the set of service layers allows the one or more client devices 120 to seamlessly connect with the set of service layers for accessing the one or more services 103. Furthermore, since, the one or more handshake messages are broadcasted to each of the set of service layers within the inter-network, the one or more intra-networks 112 or a combination thereof, each of the set of service layers includes sufficient information to process the received request. In an exemplary embodiment of the present disclosure, the one or more handshake messages include the received request, the one or more service parameters and the like.

At step 310, one or more environmental parameters associated with each of the set of service layers are determined within the established secure real time communication session based on one or more responses of the broadcasted one or more handshake messages, the received request and the one or more service parameters by using the trained service based ML model. In an exemplary embodiment of the present disclosure, the one or more environmental parameters include cost, distance to reach each of the set of service layers, latency, green energy, resiliency, a set of external devices peered to each of the set of service layers, a set of compute hosting the set of service layers and the like. The one or more responses of the broadcasted one or more handshake messages include state, configuration of each of the set of service layers, security information, subscriber data passing through the one or more client devices or one or more service layers, traffic load on each of the one or more client devices 120 and information associated with the one or more environmental parameters and the like. In an exemplary embodiment of the present disclosure, the security information includes governance compliance, risk factors and the like.

In an embodiment of the present disclosure, the method 300 includes performing one or more functionalities by using the trained service based ML model to optimize the determined one or more environmental parameters. In an exemplary embodiment of the present disclosure, the one or more functionalities include security, authentication, load distribution, cloud infrastructure resources and capabilities, routing, latency, capacity, redundancy, resilience of the established secure real time communication session and the like. In an embodiment of the present disclosure, the one or more functionalities may also facilitate determination of the best possible service layer At step 312, best possible service layer among the inter-network, the one or more intra-networks 112 or a combination thereof capable of processing the received request within the established secure real time communication session is determined based on the determined one or more environmental parameters, the received request, the one or more service parameters and predefined priority of each of the one or more client devices 120 by using the trained service based ML model. In an embodiment of the present disclosure, the determined best possible service layer is nearby to the one or more external devices 102 hosting the one or more services 103. In an embodiment of the present disclosure, the one or more intermediate service layers are determined, such that the determined one or more intermediate service layers may further determine the best possible service layer for processing the received request. In an exemplary embodiment of the present disclosure, the one or more intermediate layers may include discovery layers, control layers, data layers or any combination thereof. Further, the best possible service layer may be any discovery layer from the one or more discovery layers 106, any control layer from the one or more control layers 108, any data layer from the one or more data layers 110.

Further, in determining the best possible service layer capable of processing the received request within the established secure real time communication session based on the determined one or more environmental parameters, the received request, the one or more service parameters and the predefined priority of each of the one or more client devices 120 by using the trained service based ML model, the method 300 includes determining one or more client parameters based on the received request, the one or more service parameters and the one or more responses of the broadcasted one or more handshake messages by using the trained service based ML model. In an exemplary embodiment of the present disclosure, the one or more client parameters include the state, the configuration of each of the set of service layers, the security information, alarm information and next service layer information. In an exemplary embodiment of the present disclosure, the alarm information include information corresponding to physical faults in service layers, temperature of data centers, solar enabled data centers, storage of the data centers and the like. Further, the method 300 includes determining the best possible service layer capable of processing the received request within the established secure real time communication session based on the determined one or more environmental parameters, the received request, the one or more service parameters, the predefined priority of each of the one or more client devices 120 and the determined one or more client parameters by using the trained service based ML model. In an embodiment of the present disclosure, the one or more client parameters facilitates determination of the one or more intermediate layers. In an embodiment of the present disclosure, location of the set of service layers may also be considered to determine the best possible service layer, such that the determined best possible layer may have most optimal location.

In an embodiment of the present disclosure, before using the trained service based ML model, the trained service based ML model is required to be generated. The method 300 includes correlating the received request, the one or more service parameters, the one or more environmental parameters, one or more client parameters and the predefined priority of each of the one or more client devices 120 with each other. Further, the method 300 includes generating the trained service based ML model based on result of correlation.

At step 314, the received request is processed at the determined best possible service layer. In an embodiment of the present disclosure, processing the request includes executing the one or more services 103 at the one or more client devices 120. In executing the one or more services 103 at the one or more client devices 120, the method 300 includes fetching content of the one or more services 103 from the one or more external devices 102 and executing the fetched content on the one or more client devices 120.

At step 316, the established secure real time communication session is terminated or transferred after the received request is processed. In an exemplary embodiment of the present disclosure, the established secure real time communication session is transferred from one location to another location to enable service continuity.

In an embodiment of the present disclosure, the trained service based ML model performs reinforcement learning based on the received request, the one or more environmental parameters, the one or more service parameters, the one or more client parameters and the determined best possible service layer. The reinforcement learning may be performed online, offline or a combination thereof. In an embodiment of the present disclosure, the reinforcement, learning improves accuracy of the trained service based ML model. Further, the one or more client parameters associated with known client devices and requests associated with the known client devices are used as validation data sets to evaluate performance of the trained service based ML model. The trained service based ML model may be uploaded onto each of the set of layers periodically. In an embodiment of the present disclosure, each of the one or more discovery layers 106, the one or more control layers 108 and the one or more data layers 110 may have different trained service based ML model.

The method 300 may be implemented in any suitable hardware, software, firmware, or combination thereof.

Thus, various embodiments of the present computing system 200 provide a solution to dynamically create the distributed, self-adjusting and optimizing core network with the machine learning. The computing system 200 dynamically provide the wireless and wireline services across multi and hybrid cloud by creating an autonomous, distributed and decentralized communication network suitable for both edge centric and centralized networks with machine learning. The computing system 200 is capable of leveraging AI based distribution across all the resources, such as local or various cloud providers. Thus, the computing system 200 is capable of resolving the constraints of a given resource. Since, the computing system 200 determines the best possible service layer for accessing the one or more services 103 dynamically, based on the determined one or more environmental parameters, the received request, the one or more service parameters and the predefined priority of each of the one or more client devices 120 by using the trained service based ML model, the computing system 200 provides deployment flexibility in distributed network with several thousand compute locations, provides observability in the distributed resources being used in the system. Thus, the computing system 200 is fast and saves cost. Further, the computing system 200 allows stored data access in any location when session gets transferred from one location to another to enable service continuity. Furthermore, the computing system 200 creates an autonomous network using machine learning for optimizing the wireless and wireline network resources and call flows for reducing manual operations to save on OPEX. Further, each of the set of service layers is capable of processing the received request. Thus, each of the set of service layers is elastically scalable to expand and shrink on demand, resilient, saves energy, decreases latency and increases throughput. Further the computing system 200 provides the unified service experience across different compute environments. In an embodiment of the present disclosure, the computing system 200 may be used in multiple machines with any processor type in the form of software as a service or on premises compute and the like. The computing system 200 leverages local or cloud servers seamlessly and pairs the one or more services 103 with the nearest cloud egress by using machine learning based intelligence. In an embodiment of the present disclosure, the computing system 200 operates for packet core network running on general purpose compute. The computing system is processor agnostic and may run in heterogenous environment. In an embodiment of the present disclosure, the network is flattened, and the functionality is distributed on edge cloud. The computing system 200 may also be used in creation of one or more services 103 and one or more products, such as networking equipment including wired and wireless networking equipment, smart machines, multimedia components and the like. Furthermore, the computing system 200 may be used in various fields, such as telecommunication, healthcare, automotive, smart-city and the like. The computing system 200 provides an unprecedented solution over existing systems which do not work across many cloud and local servers seamlessly, and are constrained by the limits of a given resource, such as latency, throughput, costs and the like. In an exemplary embodiment of the present disclosure, the set of service layers and the one or more client devices 120 may be connected by using block chain technology for secure communication and data access. In an exemplary embodiment, the computing system 200 may create a digital twin of the inter-network and the one or more intra-networks 112 for further improvements and extendibility.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A method for dynamically creating a distributed core network, the method comprising:
   receiving a request from a client device to access one or more services hosted on one or more external devices, wherein the request includes a location of the client device;
   establishing a secure real time communication session with the client device using at least an initial layer from a set of layers, wherein the set of layers includes one or more discovery layers, one or more control layers, and one or more data layers;
   determining one or more service parameters associated with the one or more services based on the received request by using a trained service-based machine learning (ML) model, wherein the one or more service parameters comprise: type of the one or more services, demand of the one or more services and location of the one or more external devices hosting the one or more services;
   transmitting one or more handshake messages to the set of service layers;
   determining one or more environmental parameters associated with the set of service layers based on one or more responses of the one or more handshake messages, the received request, and the one or more service parameters;
   determining a select service layer among the set of service layers to process the received request based on the one or more environmental parameters, the received request, and the one or more service parameters; and
   processing the received request using the select service layer.

2. The method of claim 1, wherein the initial layer is a first discovery layer of the one more discovery layers, the method further comprising:
   determining, by the first discovery layer, a second discovery layer of the one more discovery layers as a first intermediate service layer.

3. The method of claim 2, further comprising:
   determining, by the first intermediate layer, a control layer of the one or more control layers as a second intermediate service layer.

4. The method of claim 3, further comprising:
   determining, by the second intermediate layer, the select service layer to process the received request, wherein the select service layer is a data layer of the one or more data layers.

5. The method of claim 1, wherein the select service layer is selected from the one or more discovery layers, the one or more control layers, and the one or more data layers.

6. The method of claim 1, further comprising:
   terminating and transferring the established secure real time communication session after the received request is processed.

7. The method of claim 1, further comprising:
   determining one or more client parameters based on the received request, the one or more service parameters and the one or more responses of the one or more handshake messages, wherein the one or more client parameters includes at least one of: state, configuration of the set of service layers, security information, alarm information, and next service layer information, wherein determining the select service layer is determined based on the one or more client parameters.

8. The method of claim 1, wherein processing the request comprises executing the one or more services at client device.

9. The method of claim 1, further comprising:
correlating the received request, the one or more service parameters, the one or more environmental parameters, one or more client parameters, and a predefined priority of the client device; and
generating the trained service-based ML model based on a result of the correlation.

10. The method of claim 1, wherein the set of service layers is associated with at least one or combination of inter-network and one or more intra-networks.

11. A system comprising:
at least one hardware processor; and
at least one memory storing instructions that, when executed by the at least one hardware processor, cause the at least one hardware processor to perform operations comprising:
receiving a request from a client device to access one or more services hosted on one or more external devices, wherein the request includes a location of the client device;
establishing a secure real time communication session with the client device using at least an initial layer from a set of layers, wherein the set of layers includes one or more discovery layers, one or more control layers, and one or more data layers;
determining one or more service parameters associated with the one or more services based on the received request by using a trained service-based machine learning (ML) model, wherein the one or more service parameters comprise: type of the one or more services, demand of the one or more services and location of the one or more external devices hosting the one or more services;
transmitting one or more handshake messages to the set of service layers;
determining one or more environmental parameters associated with the set of service layers based on one or more responses of the one or more handshake messages, the received request, and the one or more service parameters;
determining a select service layer among the set of service layers to process the received request based on the one or more environmental parameters, the received request, and the one or more service parameters; and
processing the received request using the select service layer.

12. The system of claim 11, wherein the initial layer is a first discovery layer of the one more discovery layers, the operations further comprising:
determining, by the first discovery layer, a second discovery layer of the one more discovery layers as a first intermediate service layer.

13. The system of claim 12, the operations further comprising:
determining, by the first intermediate layer, a control layer of the one or more control layers as a second intermediate service layer.

14. The system of claim 13, the operations further comprising:
determining, by the second intermediate layer, the select service layer to process the received request, wherein the select service layer is a data layer of the one or more data layers.

15. The system of claim 11, wherein the select service layer is selected from the one or more discovery layers, the one or more control layers, and the one or more data layers.

16. The system of claim 11, the operations further comprising:
terminating and transferring the established secure real time communication session after the received request is processed.

17. The system of claim 11, the operations further comprising:
determining one or more client parameters based on the received request, the one or more service parameters and the one or more responses of the one or more handshake messages, wherein the one or more client parameters includes at least one of: state, configuration of the set of service layers, security information, alarm information, and next service layer information,
wherein determining the select service layer is determined based on the one or more client parameters.

18. The system of claim 11, wherein processing the request comprises executing the one or more services at client device.

19. The system of claim 11, the operations further comprising:
correlating the received request, the one or more service parameters, the one or more environmental parameters, one or more client parameters, and a predefined priority of the client device; and
generating the trained service-based ML model based on a result of the correlation.

20. The system of claim 11, wherein the set of service layers is associated with at least one or combination of inter-network and one or more intra-networks.

* * * * *